US012682636B2

(12) United States Patent
Olechowski, III et al.

(10) Patent No.: US 12,682,636 B2
(45) Date of Patent: Jul. 14, 2026

(54) REAL-TIME MEDIA VALUATION SYSTEM AND METHODS

(71) Applicant: Blinkfire Analytics, Inc., Chicago, IL (US)

(72) Inventors: Stephen Joseph Olechowski, III, Glen Ellyn, IL (US); Nan Jiang, Lincolnshire, IL (US); Santiago Piqueras Gozalbes, Almería (ES); Ionatan Kutnowski Bloom, Valencia (ES); Scott Frederick Majkowski, Chicago, IL (US)

(73) Assignee: Blinkfire Analytics, Inc., Chicago, IL (US)

( * ) Notice: Subject to any disclaimer, the term of this patent is extended or adjusted under 35 U.S.C. 154(b) by 417 days.

(21) Appl. No.: 18/083,346

(22) Filed: Dec. 16, 2022

(65) Prior Publication Data

US 2023/0206631 A1      Jun. 29, 2023

Related U.S. Application Data

(60) Provisional application No. 63/293,602, filed on Dec. 23, 2021.

(51) Int. Cl.
*G06V 20/40*          (2022.01)
*G06N 3/084*          (2023.01)
(Continued)

(52) U.S. Cl.
CPC ............. *G06V 20/41* (2022.01); *G06N 3/084* (2013.01); *G06Q 10/40* (2026.01); (Continued)

(58) Field of Classification Search
None
See application file for complete search history.

(56) References Cited

U.S. PATENT DOCUMENTS

| | | | | |
|---|---|---|---|---|
| 8,145,526 | B2 * | 3/2012 | Redlich | .............. G06Q 30/0274 |
| | | | | 705/14.46 |
| 9,177,333 | B2 * | 11/2015 | Sinyagin | ............ G06Q 30/0241 |

(Continued)

FOREIGN PATENT DOCUMENTS

| | | | |
|---|---|---|---|
| KR | 102111491 B1 * | 5/2020 | |

OTHER PUBLICATIONS

KR-102111491-B1 (machine translation) (Year: 2020).*

*Primary Examiner* — John B Strege

(74) *Attorney, Agent, or Firm* — Carr & Ferrell LLP

(57) ABSTRACT

Various exemplary embodiments include a valuation system to measure sponsorship exposure in social media, including the ability to use multiple valuation methods, such as CPV, CPM, and CPE, integrated into the valuation system, in a real-time manner, while aggregating the most up-to-date data. It may categorize the social media by media type, image, video or text, and may run different valuation strategies based on the media type. It may adapt a valuation strategy based on the source platform of the publication, and detect the sponsorship exposures and inputs into the valuation method, as one or more factors to the valuation system, in the real-time manner. Additionally, granular valuation may be supported, given the output from the AI-driven system, on brand, asset, scene, and media exposure types. It also supports valuation on a real-time ad rate, a device factor, customization based on user configurations, e.g., discounted factors, and/or supports live stream.

20 Claims, 15 Drawing Sheets

(51) Int. Cl.

| | |
|---|---|
| *G06Q 10/40* | (2026.01) |
| *G06Q 30/0242* | (2023.01) |
| *G06Q 30/0272* | (2023.01) |
| *G06Q 30/0273* | (2023.01) |
| *H04N 21/25* | (2011.01) |
| *H04N 21/258* | (2011.01) |
| *H04N 21/466* | (2011.01) |
| *H04N 21/658* | (2011.01) |

(52) U.S. Cl.

CPC ..... *G06Q 30/0242* (2013.01); *G06Q 30/0272* (2013.01); *G06Q 30/0273* (2013.01); *G06V 20/46* (2022.01); *H04N 21/252* (2013.01); *H04N 21/25891* (2013.01); *H04N 21/4662* (2013.01); *H04N 21/6582* (2013.01)

(56) References Cited

U.S. PATENT DOCUMENTS

| | | | | |
|---|---|---|---|---|
| 9,870,571 | B1 * | 1/2018 | LaMontagne | A63F 13/30 |
| 9,875,234 | B2 | 1/2018 | Myslinski | |
| 9,996,853 | B2 * | 6/2018 | Myers | G06Q 30/0247 |
| 10,057,644 | B1 | 8/2018 | Farre Guiu et al. | |
| 10,192,131 | B2 | 1/2019 | Olechowski et al. | |
| 10,438,224 | B1 * | 10/2019 | Layne | G06Q 30/0224 |
| 10,467,526 | B1 | 11/2019 | Appalaraju et al. | |
| 10,699,167 | B1 | 6/2020 | Dowdall et al. | |
| 10,762,374 | B2 | 9/2020 | Olechowski, III et al. | |
| 11,151,598 | B2 | 10/2021 | Olechowski, III et al. | |
| 11,507,866 | B1 * | 11/2022 | Butler | G06N 20/20 |
| 11,741,364 | B2 * | 8/2023 | Tilton | G06Q 50/01 |
| | | | | 706/18 |
| 12,080,046 | B2 * | 9/2024 | Saraee | G06V 10/82 |
| 12,505,653 | B2 | 12/2025 | Olechowski et al. | |
| 2005/0018904 | A1 | 1/2005 | Davis | |
| 2007/0022329 | A1 | 1/2007 | Adamnek et al. | |
| 2008/0144942 | A1 | 6/2008 | Besley et al. | |
| 2009/0123025 | A1 | 5/2009 | Deng et al. | |
| 2009/0177537 | A1 * | 7/2009 | Taylor | G06Q 30/02 |
| | | | | 705/14.69 |
| 2009/0192929 | A1 * | 7/2009 | Hoeflinger | G06Q 30/0273 |
| | | | | 705/14.69 |
| 2009/0292595 | A1 * | 11/2009 | Tonnison | G06Q 50/01 |
| | | | | 707/999.005 |
| 2009/0327057 | A1 * | 12/2009 | Redlich | G06Q 30/0218 |
| | | | | 705/14.2 |
| 2010/0332404 | A1 * | 12/2010 | Valin | G06Q 99/00 |
| | | | | 705/310 |
| 2011/0145064 | A1 | 6/2011 | Anderson et al. | |
| 2011/0288907 | A1 | 11/2011 | Harvey et al. | |

| | | | | |
|---|---|---|---|---|
| 2011/0313865 | A1 * | 12/2011 | Sinyagin | G06Q 30/0273 |
| | | | | 705/14.69 |
| 2012/0158461 | A1 * | 6/2012 | Aldrey | G06Q 30/0242 |
| | | | | 705/7.29 |
| 2012/0197712 | A1 | 8/2012 | Martignoni et al. | |
| 2012/0263385 | A1 | 10/2012 | van Zwol et al. | |
| 2012/0284105 | A1 | 11/2012 | Li | |
| 2013/0054484 | A1 * | 2/2013 | Hoeflinger | G06Q 30/0273 |
| | | | | 705/329 |
| 2013/0073388 | A1 | 3/2013 | Heath | |
| 2013/0085803 | A1 | 4/2013 | Mauro et al. | |
| 2013/0325550 | A1 | 12/2013 | Varghese et al. | |
| 2013/0346172 | A1 | 12/2013 | Wu | |
| 2014/0052527 | A1 | 2/2014 | Roundtree | |
| 2014/0052555 | A1 | 2/2014 | MacIntosh | |
| 2014/0219569 | A1 | 8/2014 | Manson et al. | |
| 2015/0023602 | A1 | 1/2015 | Wnuk et al. | |
| 2015/0317670 | A1 | 11/2015 | Cavander et al. | |
| 2015/0332317 | A1 | 11/2015 | Cui et al. | |
| 2016/0034712 | A1 | 2/2016 | Patton et al. | |
| 2016/0042253 | A1 | 2/2016 | Sawhney et al. | |
| 2016/0189200 | A1 | 6/2016 | Olechowski et al. | |
| 2016/0203225 | A1 | 7/2016 | Alonso et al. | |
| 2016/0239719 | A1 | 8/2016 | Olechowski et al. | |
| 2016/0292722 | A1 * | 10/2016 | Myers | G06Q 30/0243 |
| 2017/0140270 | A1 | 5/2017 | Mnih et al. | |
| 2018/0018698 | A1 * | 1/2018 | LaMontagne | G06Q 30/0242 |
| 2018/0082123 | A1 | 3/2018 | Katz et al. | |
| 2018/0082125 | A1 * | 3/2018 | Katz | G06N 3/08 |
| 2018/0082152 | A1 * | 3/2018 | Katz | G06F 16/7837 |
| 2018/0084290 | A1 * | 3/2018 | Katz | G06V 20/46 |
| 2018/0084309 | A1 * | 3/2018 | Katz | G06N 3/08 |
| 2018/0084310 | A1 * | 3/2018 | Katz | G06N 3/045 |
| 2018/0349726 | A1 | 12/2018 | Olechowski et al. | |
| 2019/0098345 | A1 * | 3/2019 | Rahman | H04N 21/25891 |
| 2019/0311268 | A1 * | 10/2019 | Tilton | G06N 3/084 |
| 2020/0075148 | A1 | 3/2020 | Nguyen et al. | |
| 2020/0234088 | A1 | 7/2020 | Taha et al. | |
| 2020/0302223 | A1 | 9/2020 | Dutta | |
| 2020/0320769 | A1 | 10/2020 | Chen et al. | |
| 2020/0366959 | A1 | 11/2020 | Pau et al. | |
| 2021/0035180 | A1 * | 2/2021 | Chakraborty | G06F 16/24578 |
| 2021/0158036 | A1 | 5/2021 | Huber | |
| 2021/0248629 | A1 | 8/2021 | Sullivan et al. | |
| 2022/0084223 | A1 | 3/2022 | Norris | |
| 2022/0101371 | A1 * | 3/2022 | Beerbower | G06Q 30/0244 |
| 2023/0119208 | A1 | 4/2023 | Jiang et al. | |
| 2023/0169758 | A1 | 6/2023 | Olechowski, III et al. | |
| 2023/0334092 | A1 * | 10/2023 | Katz | G06F 16/7837 |
| 2024/0070725 | A1 | 2/2024 | Aher et al. | |
| 2024/0193913 | A1 * | 6/2024 | Saraee | G06N 3/045 |
| 2024/0242287 | A1 * | 7/2024 | Rice | G06F 3/04815 |
| 2026/0057651 | A1 | 2/2026 | Olechowski et al. | |

* cited by examiner

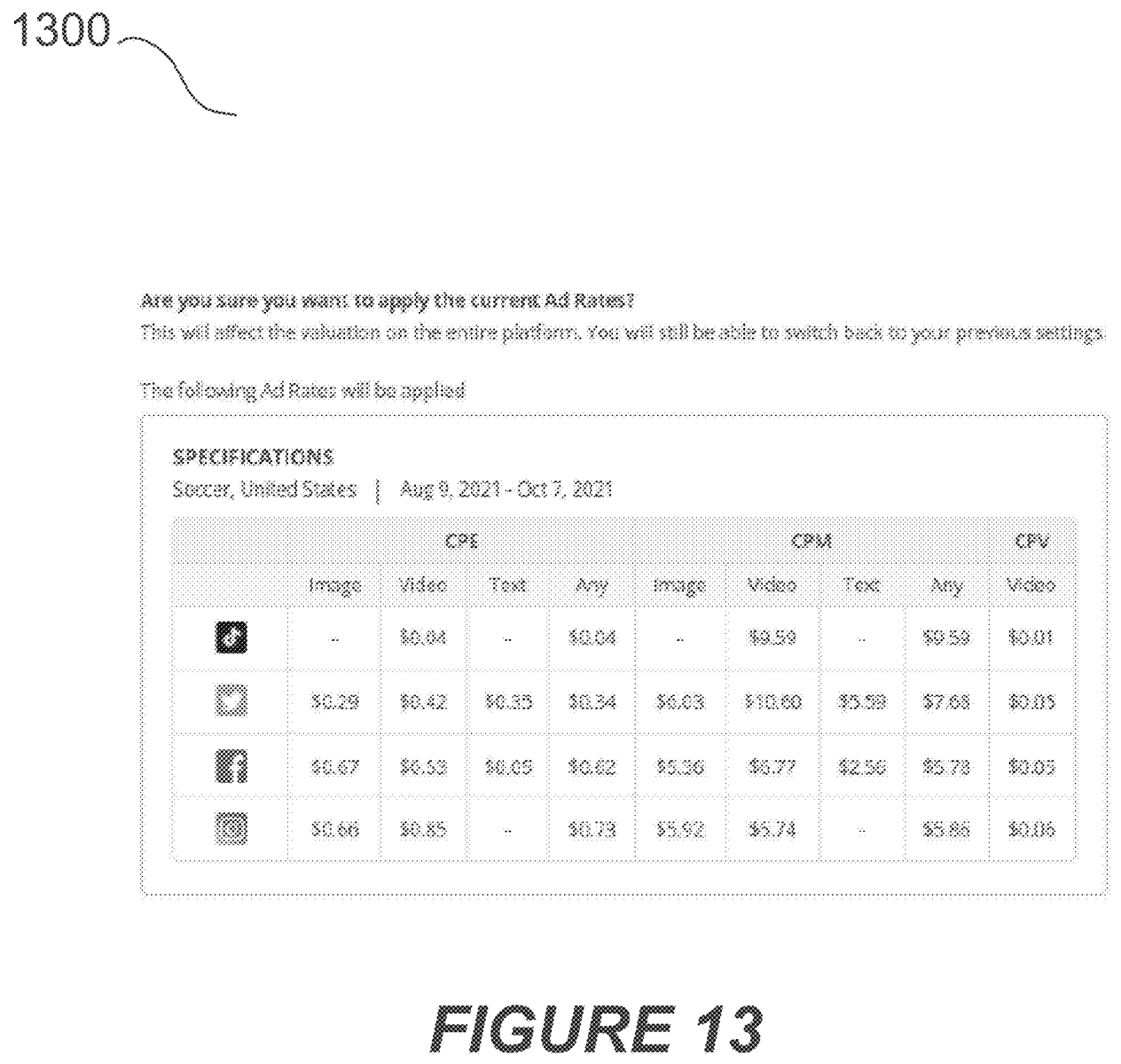

Are you sure you want to apply the current Ad Rates?

This will affect the evaluation on the entire platform. You will still be able to switch back to your previous settings The following Ad Rates will be applied

SPECIFICATIONS
Soccer, United States | Aug 9, 2021 - Oct 7, 2021

| | CPS | | | | CPM | | | | CTR | |
|---|---|---|---|---|---|---|---|---|---|---|---|
| | Image | Video | Text | Any | Image | Video | Text | Any | | Any | Video |
| | - | $0.34 | - | $0.04 | - | $9.59 | - | $9.59 | | $9.59 | $0.31 |
| | $0.29 | $0.42 | $0.35 | $0.24 | $6.03 | $10.80 | $5.59 | $7.88 | | | $0.33 |
| | $0.66 | $0.55 | $0.05 | $0.02 | $5.56 | $5.77 | $2.58 | $5.70 | | | $0.05 |
| | $0.66 | $0.65 | - | $0.73 | $5.92 | $5.74 | - | $5.66 | | | $0.36 |

FIGURE 13

REAL-TIME MEDIA VALUATION SYSTEM AND METHODS

CROSS-REFERENCE TO RELATED APPLICATIONS

The present application claims the priority benefit of U.S. Provisional Patent Application Ser. No. 63/293,602, filed on Dec. 23, 2021, titled "Real-Time Media Valuation System". This application is related to U.S. Non-Provisional patent application Ser. No. 18/070,375, filed Nov. 28, 2022, titled "Auto-Review System," which in turn claims the priority benefit of U.S. Provisional Patent Application Ser. No. 63/285,009, filed on Dec. 1, 2021, titled "Auto-Review System." This application is related to U.S. patent application Ser. No. 17/967,784, filed on Oct. 17, 2022, titled "Sponsorship Exposure Metric System," which claims the benefit and priority of U.S. Provisional Patent Application Ser. No. 63/257,917, filed on Oct. 20, 2021, titled "Sponsorship Exposure Metric System." This application is related to U.S. Non-Provisional patent application Ser. No. 16/057, 386, filed on Aug. 7, 2018 titled, "Logo Image Identification System," as issued on Jan. 29, 2019 as U.S. Pat. No. 10,192,131, which is a divisional application of U.S. Non-Provisional patent application Ser. No. 14/998,289, filed on Dec. 23, 2015," titled "High Accuracy Image Identification System," as issued on Sep. 1, 2020 as U.S. Pat. No. 10,762,374, which claims the priority benefit of U.S. Provisional Application No. 62/098,241 filed on Dec. 30, 2014, titled "High Accuracy Image Identification in Social Media." The aforementioned applications are hereby incorporated by reference in their entireties, including all appendices.

FIELD OF TECHNOLOGY

The present technology pertains to systems and methods for media valuations, media exposure quantification, and user engagement analysis. In particular, but not by way of limitation, the present technology provides a real-time media valuation system.

SUMMARY

In some embodiments the present technology is directed to a method for valuing media content exposure, the method comprising: detecting a shared or posted media item on a media platform or application; categorizing the social media item by a media type where media type could be text, image, or video; selecting at least one valuation method from one or more recognized valuation techniques; sending the social media item to an AI-driven sponsorship measurement system, the AI-driven sponsorship measurement system configured to detect brands, assets, scenes, and media exposure types in the media item; and generate metrics of the brands, assets, scenes, and media exposure types, the metrics may include one or more of a visual appearance, occlusion, blurriness, contrast, size, appearance duration, viewers present at time of exposure, and screen share of the brands, scenes, and the assets in the media item; and valuing one or more of the media item, the brands, and the assets present via one or more of customizable or preset cost per metric formulas, custom or preset valuations, and in relation to auction prices for advertising rates auction prices.

Various exemplary embodiments include a valuation system to measure sponsorship exposure in social media, including the ability to use multiple valuation methods, such as CPV, CPM, and CPE, integrated into the valuation system, in a real-time manner, while aggregating the most up-to-date data. It may categorize the social media by media type, image, video or text, and may run different valuation strategies based on the media type. It may adapt a valuation strategy based on the source platform of the publication, and detect the sponsorship exposures and inputs into the valuation method, as one or more factors to the valuation system, in the real-time manner. Additionally, granular valuation may be supported, given the output from the AI-driven system, on brand, asset, scene, and media exposure types. It also supports valuation on a real-time ad rate, a device factor, customization based on user configurations, e.g., a discounted factor, and/or supports live stream.

BRIEF DESCRIPTION OF THE DRAWINGS

In the description, for purposes of explanation and not limitation, specific details are set forth, such as particular embodiments, procedures, techniques, etc. to provide a thorough understanding of the present technology. However, it will be apparent to one skilled in the art that the present technology may be practiced in other embodiments that depart from these specific details.

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Figure 1:
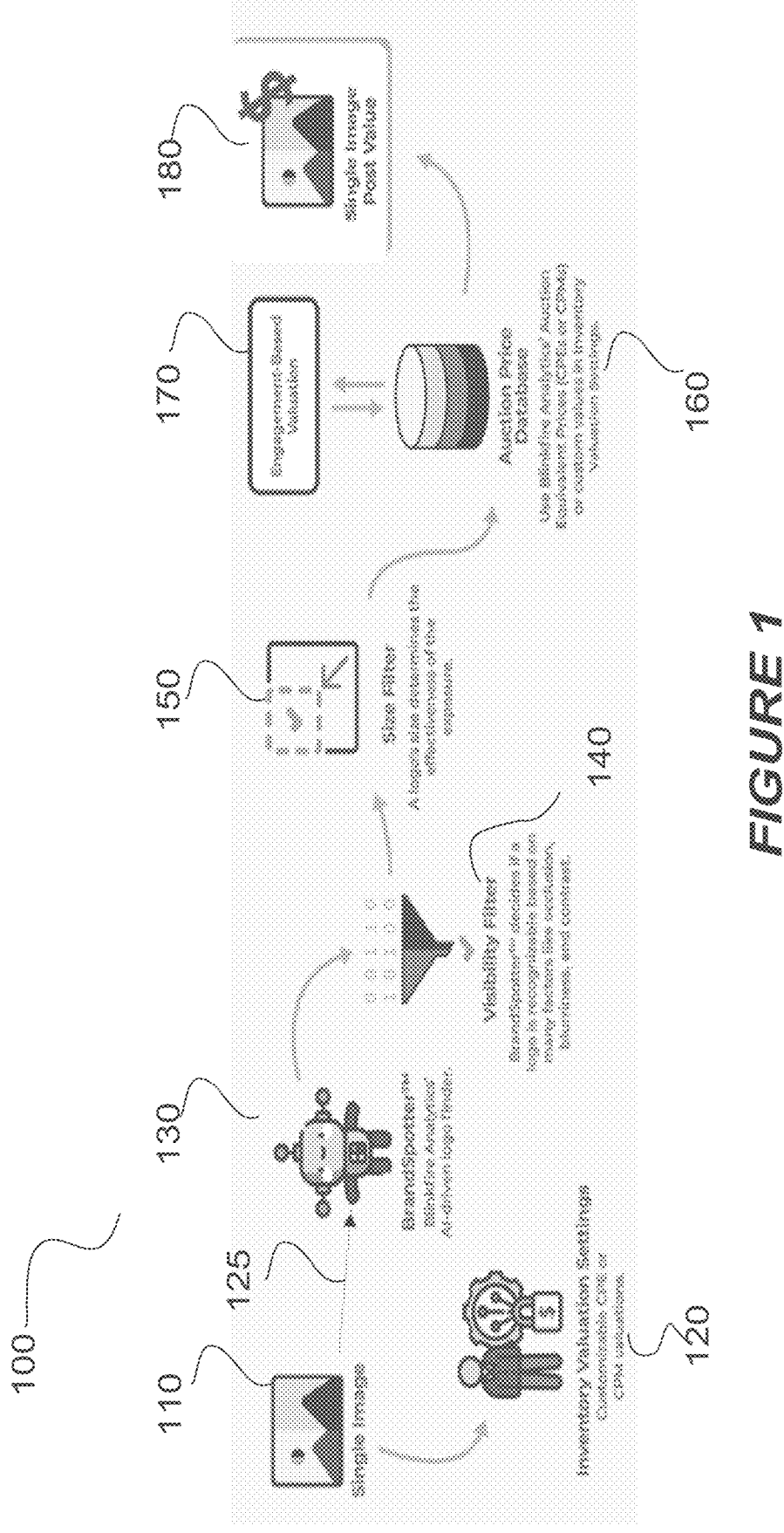

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1 presents a flow chart of a valuation method of an image item.

Figure 2:
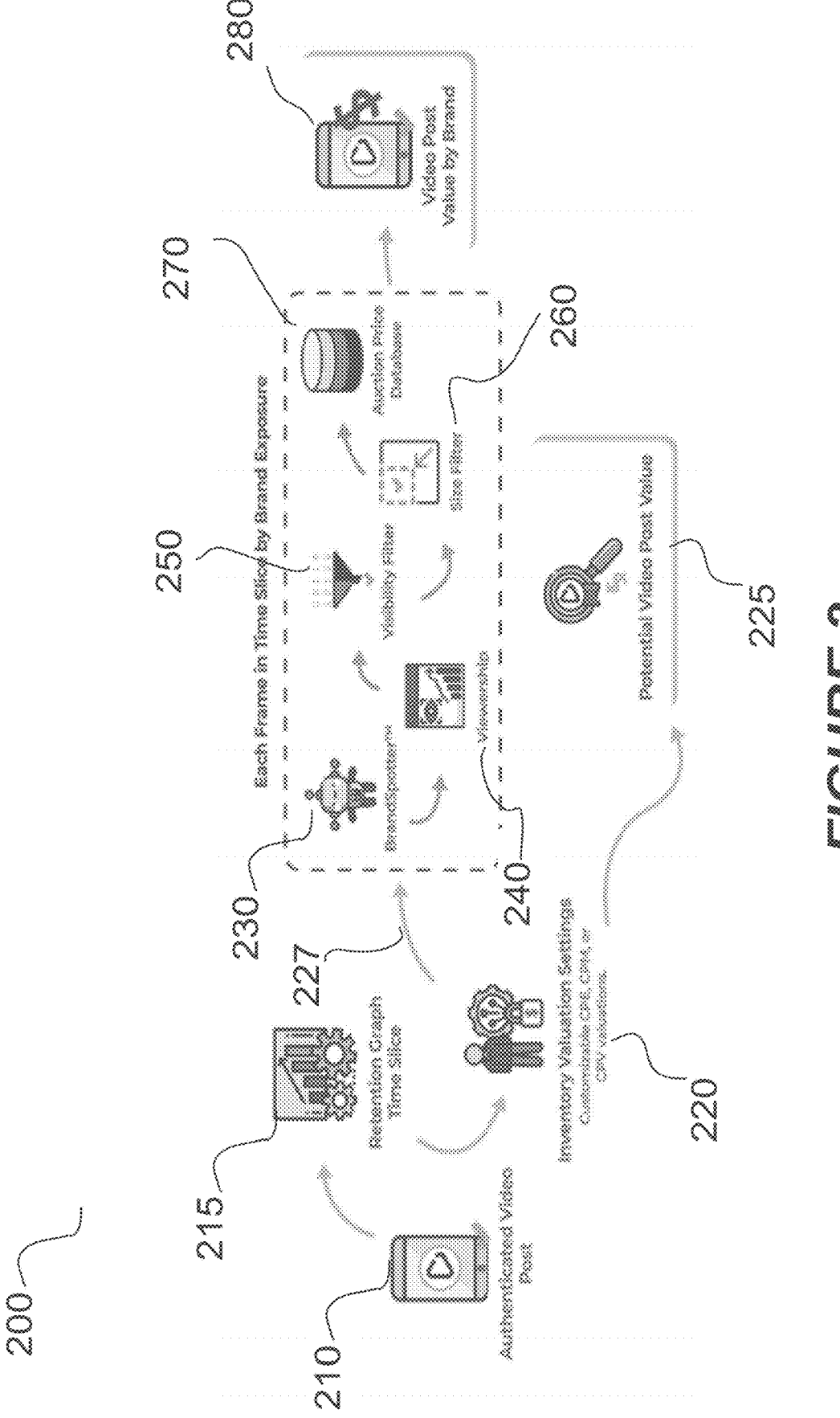

FIG. 2 presents a flow chart of a valuation method of a video item.

Figure 3:
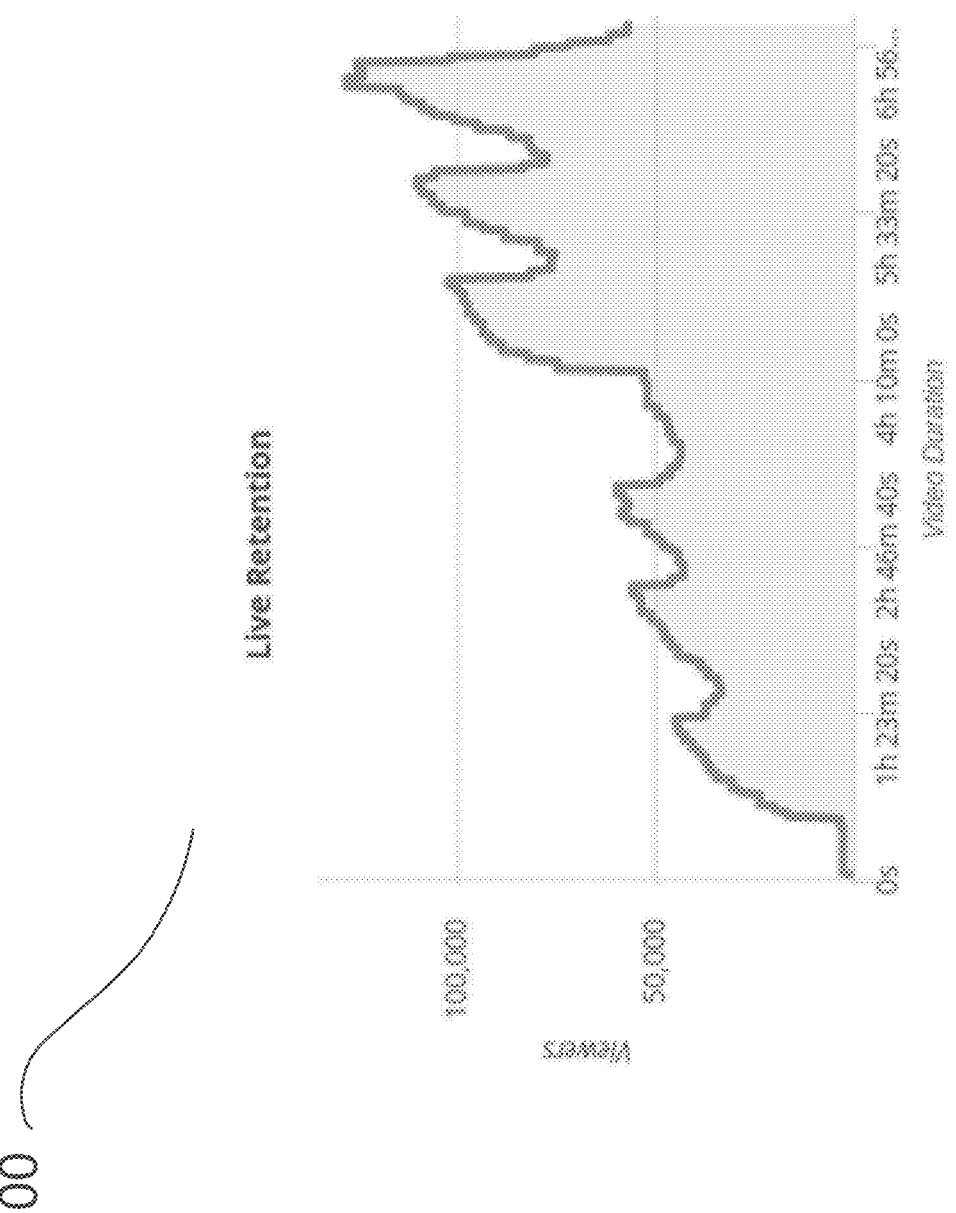

FIG. 3 presents one embodiment of a graph displaying live viewer retention.

Figure 4:
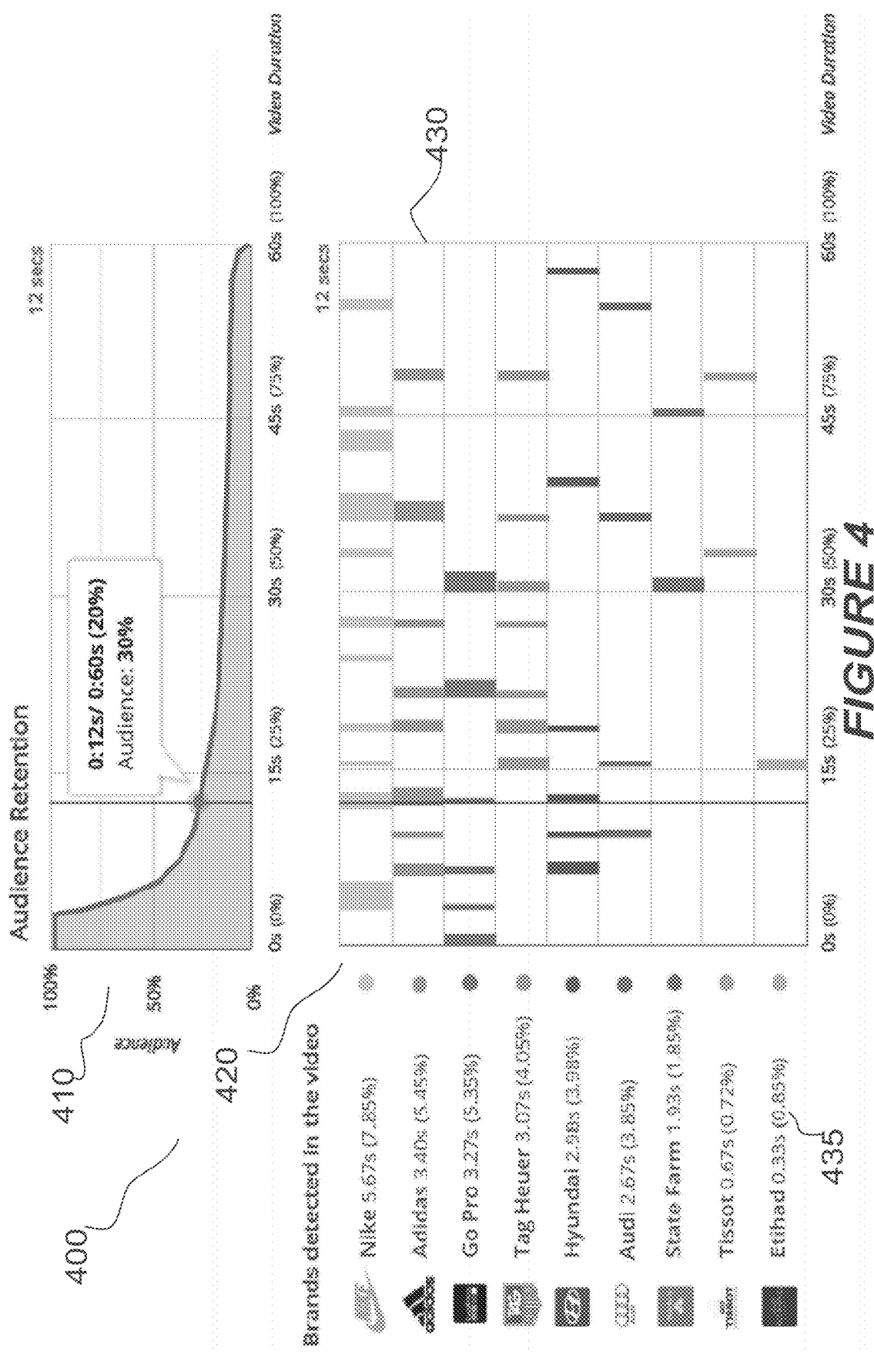

FIG. 4 presents an embodiment of a user interface (UI) for brand detection and identification associated with viewer retention data.

Figure 5:
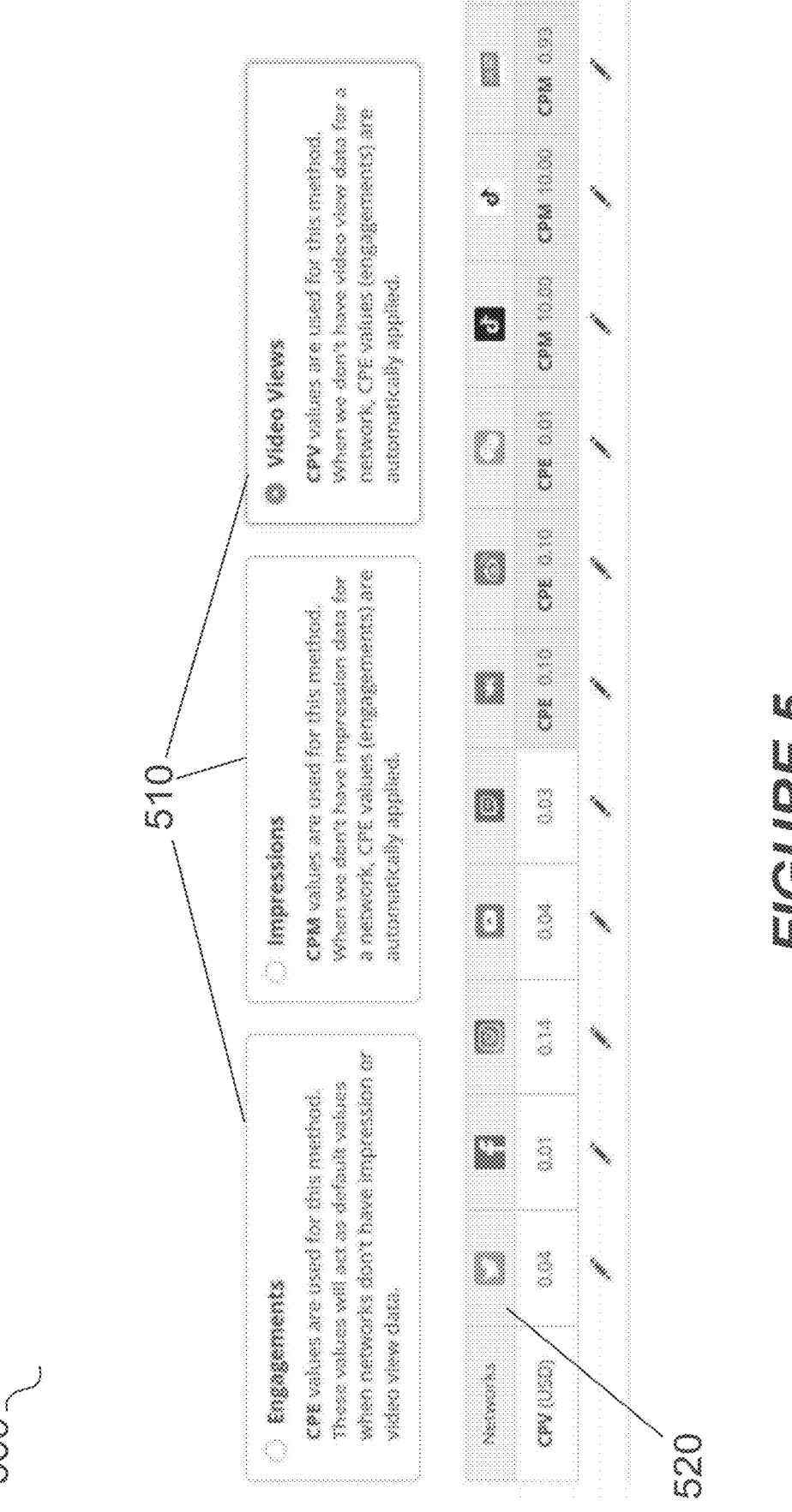

FIG. 5 presents one embodiment of a user interface to select a valuation method.

Figure 6:
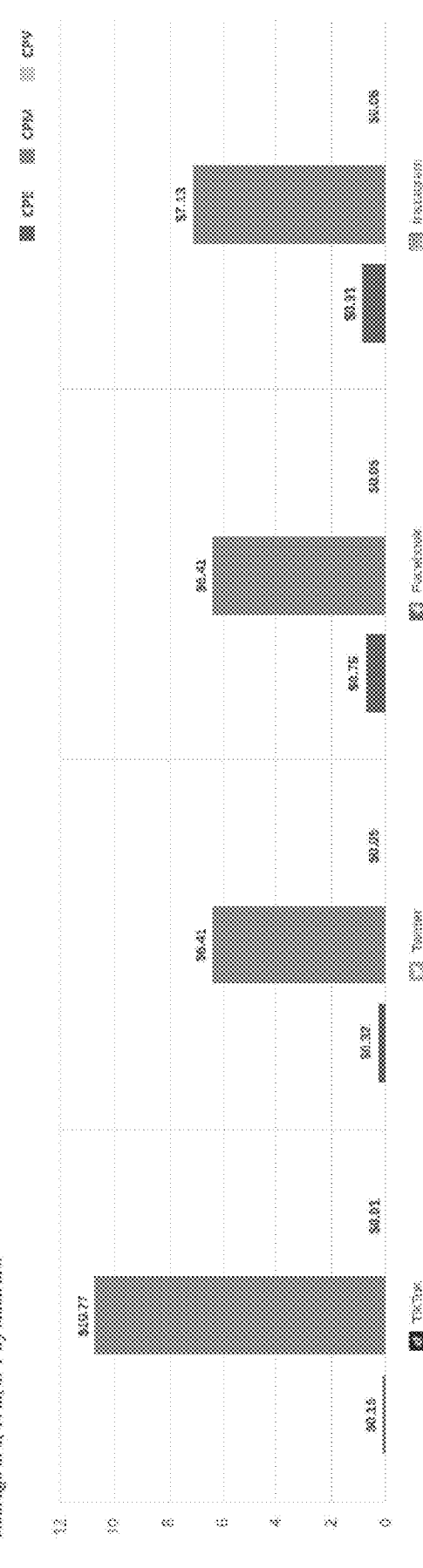

FIG. 6 presents one embodiment of a UI displaying real-time advertising rates on social media platforms.

Figure 7:
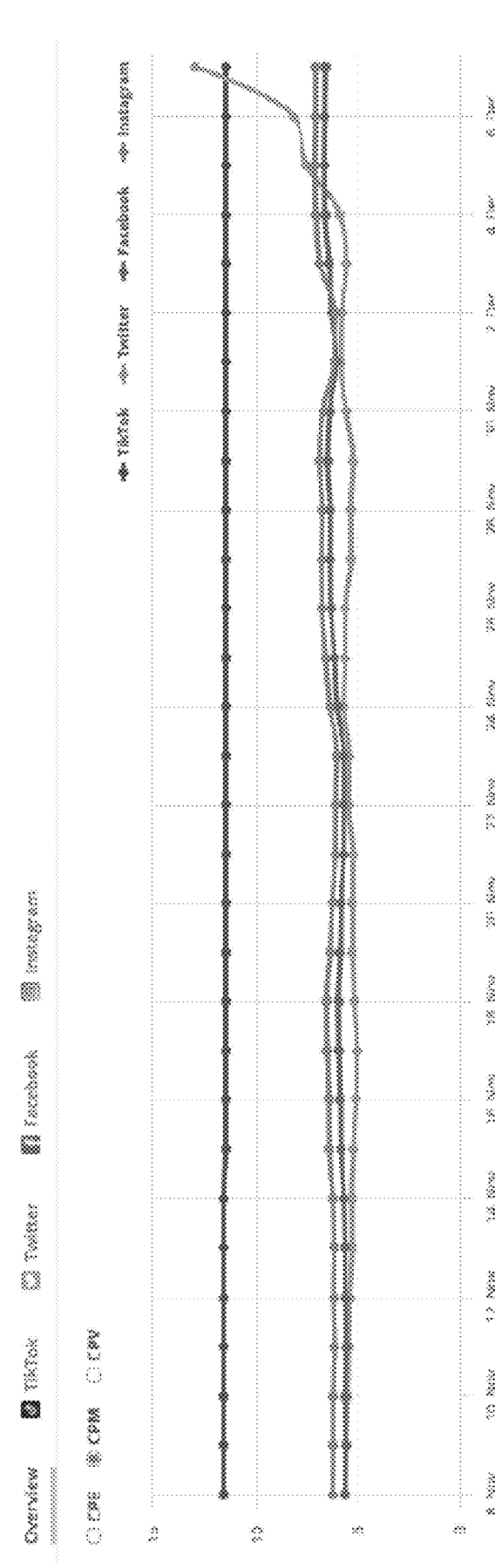

FIG. 7 presents another embodiment of a UI displaying real-time advertising rates on different media platforms.

Figure 8:
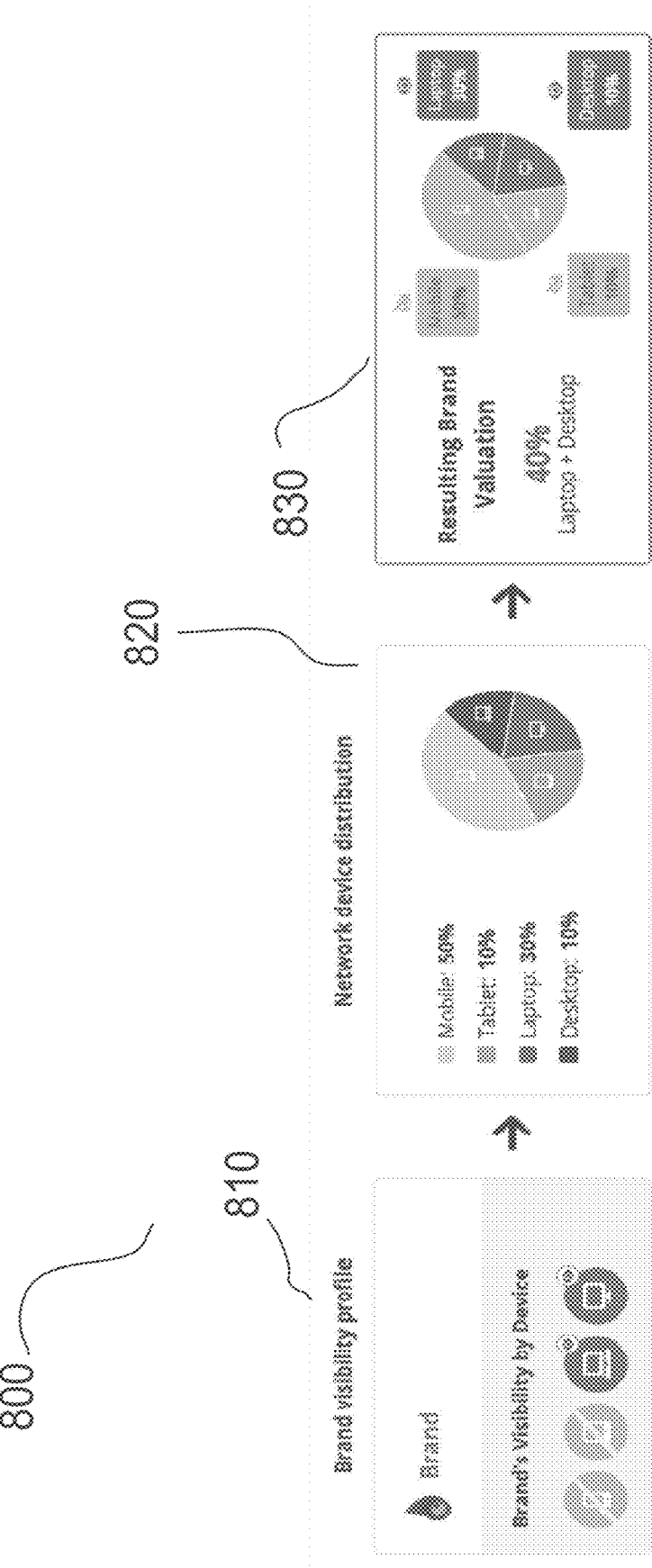

FIG. 8 presents an embodiment of integration of strength meter into brand valuation.

Figure 9:
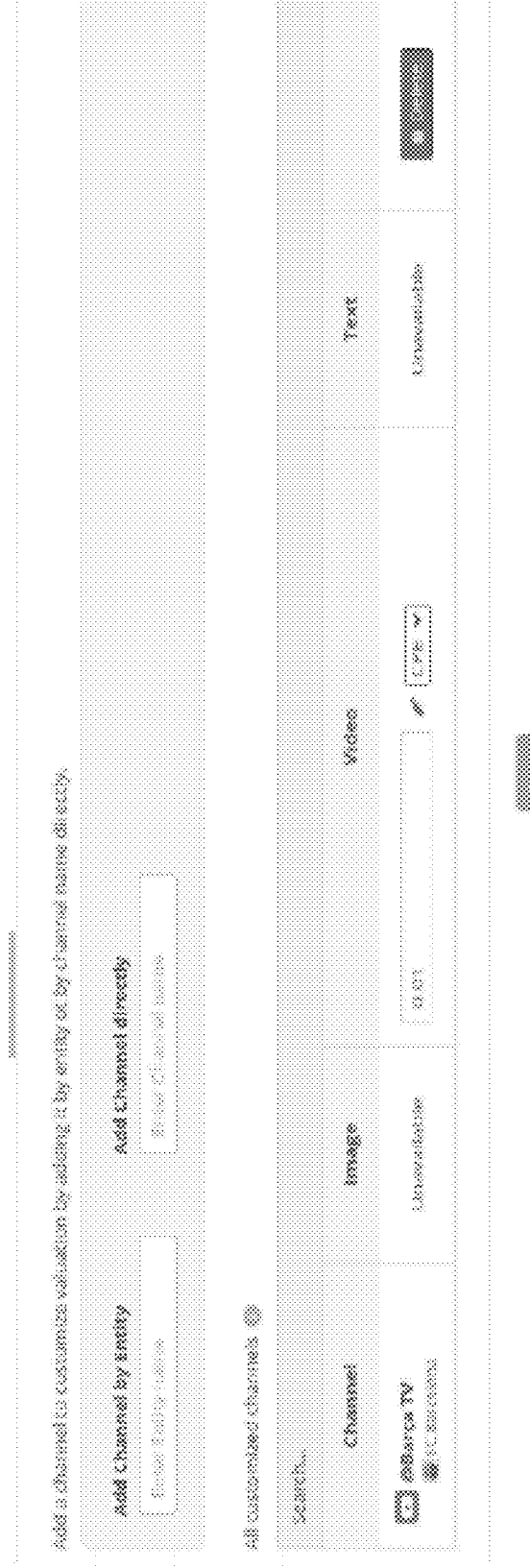

FIG. 9 presents a UI for social media platform specific valuation setting.

Figure 10:
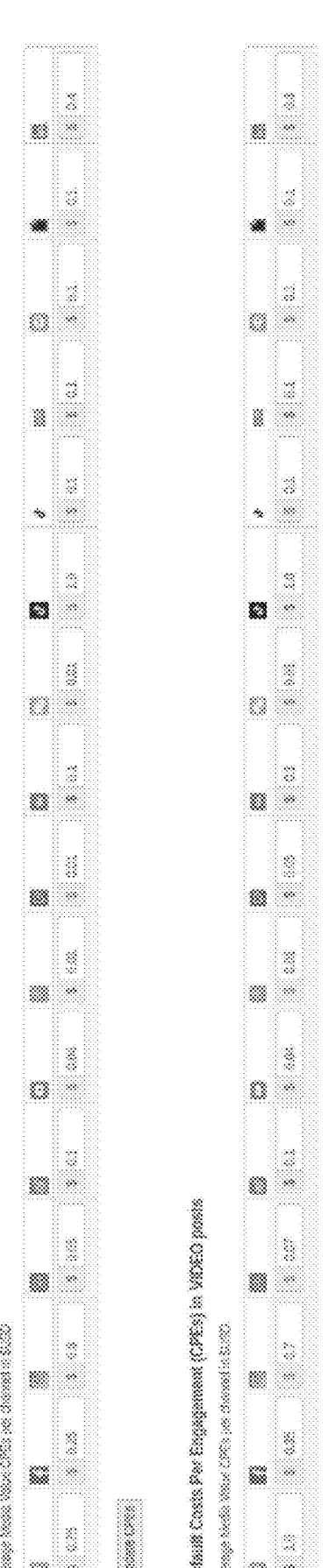

FIG. 10 presents a UI to manually set and control media platform valuations.

Figure 11:
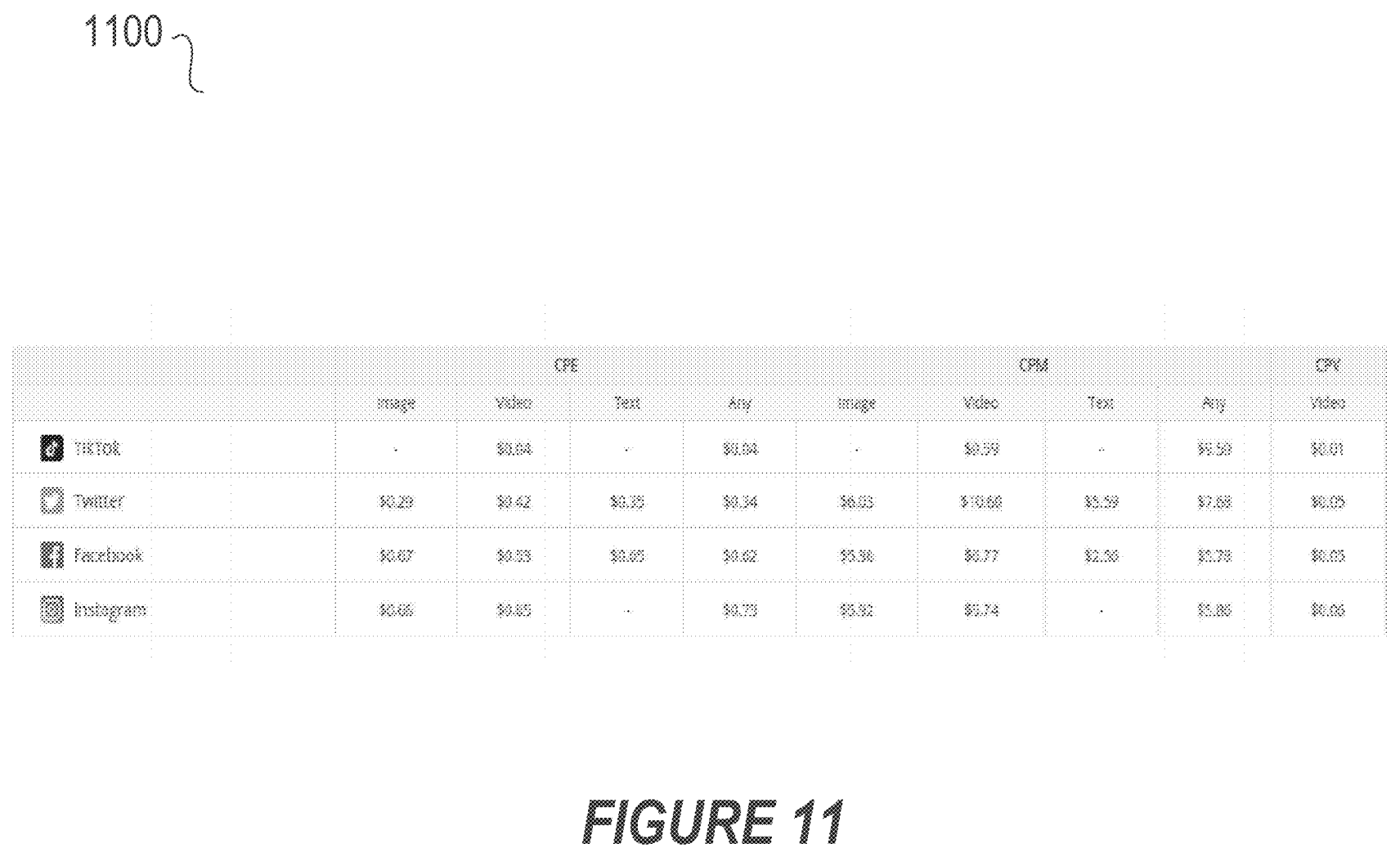

FIG. 11 presents a UI that displays and compares real-time media advertising rates.

Figure 12:

FIG. 12 presents an embodiment of a UI displaying advertising rates by country on a map.

FIG. 13 presents a UI to apply advertising rates to different media platforms.

Figure 14:
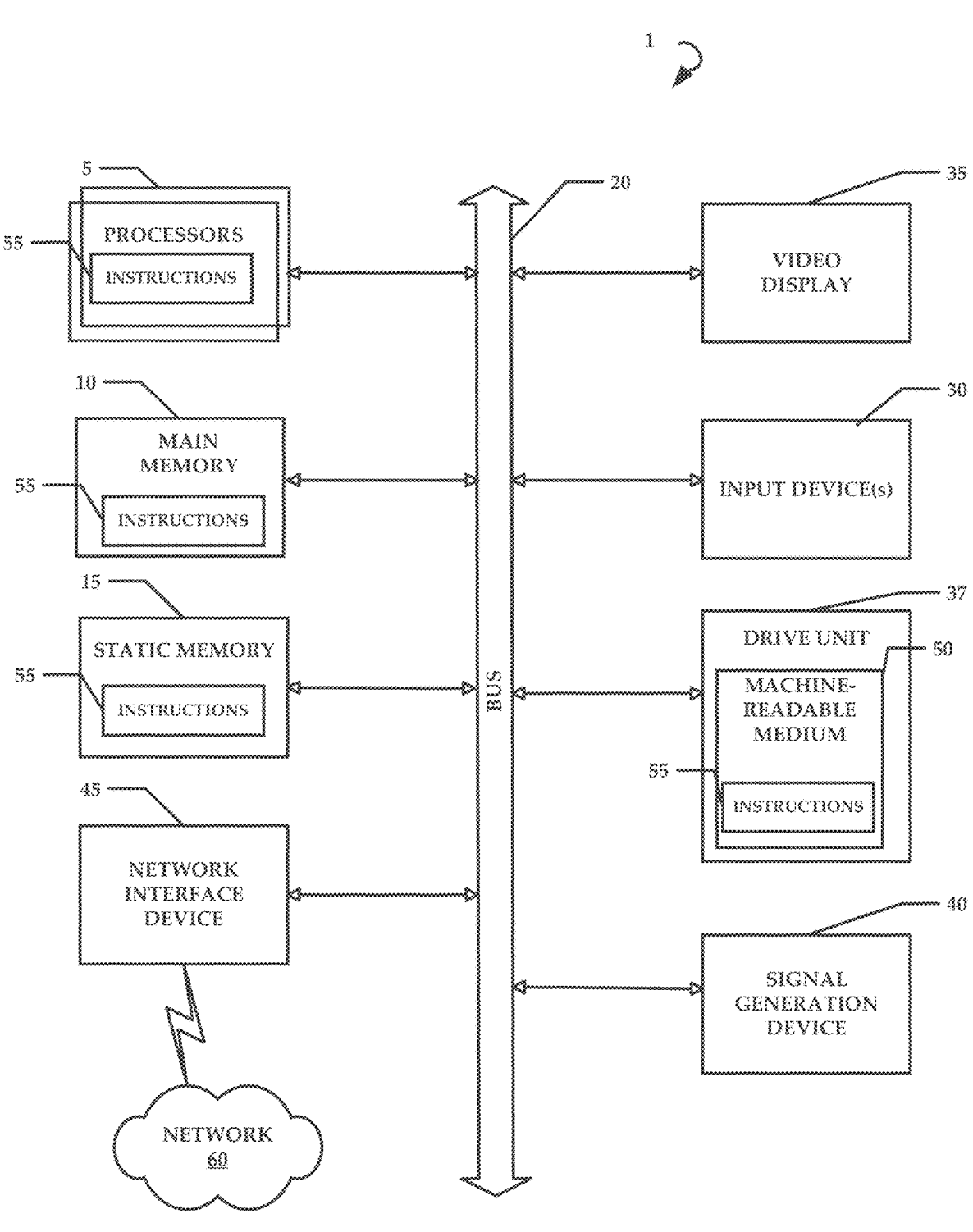

FIG. 14 is a diagrammatic representation of an example machine able to perform any one or more of the methodologies discussed herein.

Figure 15:
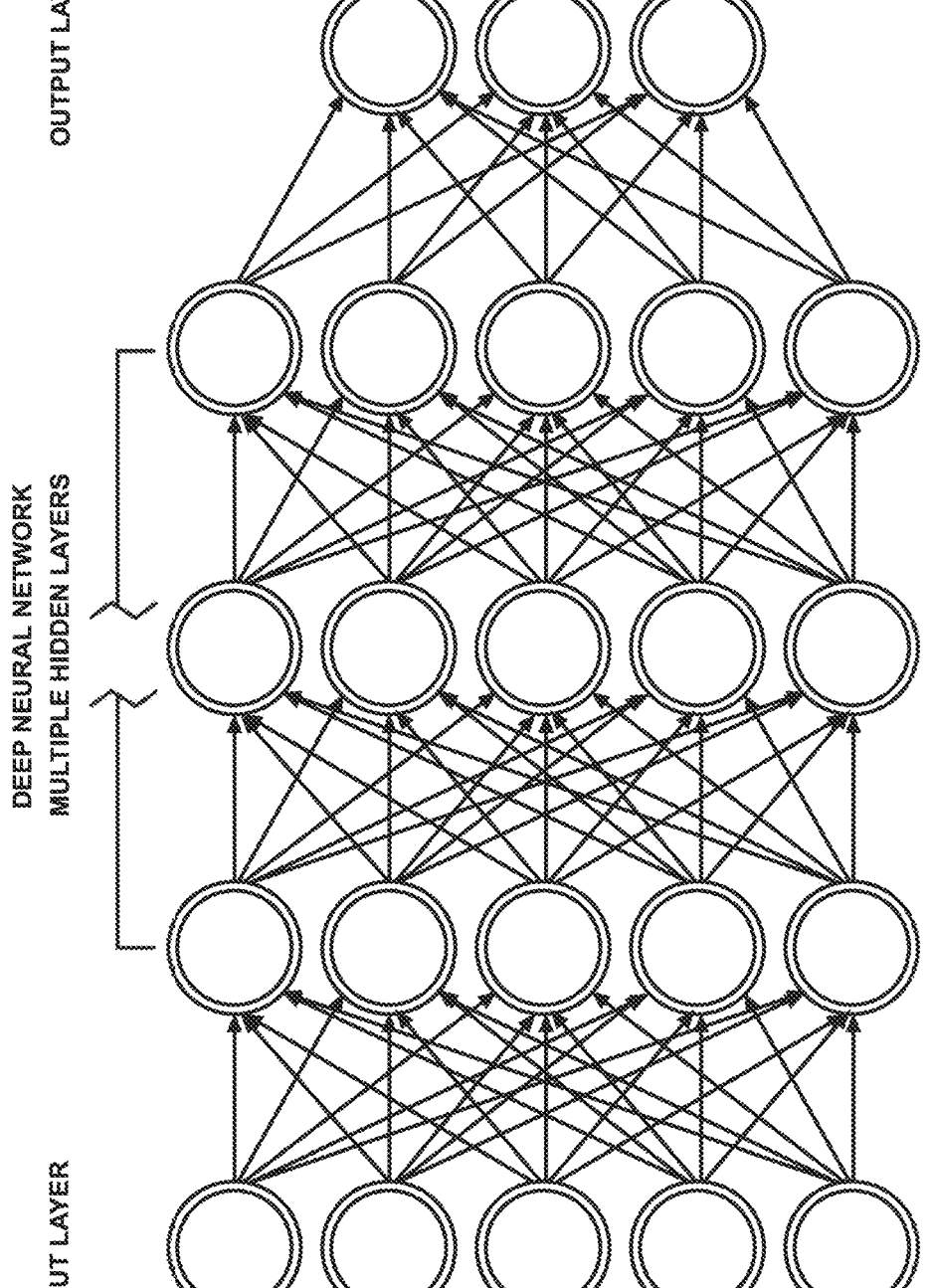

FIG. 15 shows an exemplary deep neural network.

Also included are Appendices "A" and "B."

DETAILED DESCRIPTION

Media and advertising platforms are diverse and distributed across several technologies, and are available on various devices. Social media primarily exist, are designed for and accessed on phones and tablets, while television shows, movies, and programs are accessed on televisions and technology agnostic streaming services, and blogs, websites, gaming, streaming video services, and social media are accessible by personal computing devices, consoles, tablets, and smartphones. This diversification of media types and media sources makes it difficult for advertisers, content creators, and publishers to accurately quantify the value of media exposure on any of these mediums or devices, and to assess the value of exposure of a brand, logo, individual (such as an actor, influencer, or model), or other asset (collectively referred to herein as "assets"). The problem is compounded by the nature of these media platforms and technological devices, both of which are continuously evolving. The real-time nature of these mass media means of communication adds an extra layer of complexity to valuing advertising and media exposure, especially on social media platforms where a post or publication may be either posted, shared, or commented on millions of times by numerous users throughout different geographical locations.

Quantification of media and advertising values are undertaken by some social media platforms as well as other media platforms, including over-the-top (OTT) internet media, webpages, television channels, cable TV and the like (collectively referred to herein as "media platforms"), for example, Twitter allows for estimation of the value of posts based on the number of impressions, likes, comment count, and retweet counts. These numbers are then multiplied by a baseline rate, which is then adjusted based on other factors, such as the visual appearance of an asset in a post, the duration the asset is on screen, the screen share of the asset, its clarity, and its position. However, this is a segmented approach where each media platform utilizes its own metrics (if any) to quantify values of media exposure. Furthermore, this approach is limited in that it does not allow comparison of values and access to the underlying methodologies used for valuing content. These methods are also fixed in the way they evaluate media postings and publications, in manners limited to the particular media platform.

The technologies presented herein provide solutions for advertisers, publishers, and creators to quantify the value of asset exposure on each platform for various types of media items (the different media types are collectively referred to herein as "media types") such as text, images, video, three-dimensional media items or assets and/or media items or assets set in augmented or virtual realities (items of all media types are collectively referred to hereinafter as "media items"). These valuation solution technologies provide accurate, real-time, transparent, cross-platform quantitative analysis and valuations. In several embodiments, the Blinkfire Valuation System ("BVS") and a list of valuation methods it covers can produce and provide quantitative measurements of the value of sponsorship exposure in social media publications.

In various embodiments, a media item of any media type and/or asset is input into BVS, which then outputs performance and/or monetary values of the media item and/or assets. In many embodiments, BVS only uses a single "post" (e.g., a social media post which includes or comprises one or more media items and/or asset(s)) as an input. A media item may be in one or more posts, and assets may be measured as part of media items or separately. BVS selects a valuation method for each post. This selection may be partially or fully based on one or more of: the media type(s), the type of post or publication, a user's or platform's settings, or the type or quantity of assets.

Several embodiments of the technology allow integration and comparison of real-time auction equivalent advertising rates paid on social networks (for example, TikTok, Twitter, Instagram) by various categories, including by media type, e.g., different rates for an image than those for a video, as well as by different rate type (or costing methods) including CPM (cost per 1000 impressions), CPV (cost-per-view) and CPE (cost-per-engagement) among others that may be completely created or customized by users or otherwise preset to value media items (collectively referred to as "valuation methods" or "cost per metric formulas"). Other categories include assets in those media items as well as different types of media exposure, such as active or passive exposure of information, or combinations thereof. Embodiments also allow the valuation systems and methods to be adaptive to each media or social media platform, with each media or social media platform able to select and/or set its own parameters used for valuations. The presented methods and systems are also adaptive to users and provide flexible user parameter choice, valuation selections, and settings. Valuation methods and calculations may be dynamic and updated automatically in real-time. An advertising rate engine may pull and update these figures for BVS. Users may be able to integrate the advertising rate engine directly into BVS to enable the valuation of their content at the most updated and accurate market rates. The valuation methods and formula, as well as engagement calculations, may be tailored to each media platform and media type and are described in detail in Appendix B.

The technologies presented herein also provide users, publishers, creators, and advertisers access to valuation data directly, and at any time throughout the life of a media item post, broadcast, or publication/circulation on media platforms. This is important because BVS automatically generates and aggregates valuations of media items in real-time, with continuous and constant updates based on exposure factors and the discussed valuation methods, allowing users to see and track the value of these posts over time. Users may also select between different valuation methods in multiple dimensions, and with several datapoints that they may select from.

Users may also tailor valuation parameters based on their specific needs, their target audience, the media platform, the media item type, and additional dynamics that may be applied. In several embodiments, a strength meter is utilized or generated, which describes and indicates the strength of a specific brand detection, by calculating and incorporating additional factors including the visual appearance of the media item(s) and/or asset(s) as well as its visibility on different types of devices, for example on smartphones, tablets, and personal computers. In many embodiments, the key performance indicators include the media platform, the media type, the valuation methods chosen as well as the strength metric with dynamic factor incorporation and calculation.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

FIG. 1 presents one embodiment of a valuation method 100 of an image media item. An image is pulled or received 110 by BVS, in some embodiments, directly from the media platform where it was published. In many embodiments the image is sent or provided to BVS. In preferred embodiments this image is then sent or is received 125 by an AI-driven sponsorship exposure system or program, which detects and/or identifies 130 assets, or brands, and exposure types. An AI-driven sponsorship exposure system then determines whether the asset(s) are recognizable, clear and/or visible 140 including by measuring or calculating factors such as screenshare, occlusion, blurriness, clarity, and contrast of one or more assets in the image and/or the media item itself. The AI-driven sponsorship exposure system may also generate 150 additional metrics that may include the screenshare, prominence and/or position of an asset in the media item. BVS may then use, generate, and/or use generated 160 auction equivalent prices based on the valuation settings along with engagement-based valuation 170 to calculate 180 the value of the single image/media item/or asset value that is posted or published. In several embodiments BVS extracts or applies 120 user configuration settings of valuation methods or other valuation settings that may have been automatically generated or pulled from other sources. BVS may use these user configuration settings along with the metrics generated by the AI-driven sponsorship exposure system and any other detected asset mentions, texts or links in the media item, including any engagement-based or impression-based valuations, and analytics auction equivalent prices based on one or more valuation methods. BVS calculates 180 one or more of: the value of the post or published media item, brand, asset, and exposure type values in real-time.

FIG. 2 presents another embodiment of a valuation method 200 of a video media item. The valuation method 200 incorporates the steps of valuation method 100 but also differs in several aspects. A video is pulled or received 210 by BVS, in some embodiments, directly from the media platform where it was published, and in many embodiments, the video is pulled along with relevant metrics including number of views, impressions, and video retention data. Alternatively, the video is sent or provided to BVS. In some embodiments, a video is segmented into portions or frames, which are individually assessed. In preferred embodiments, a segment of the video is then sent or is received 227 by an AI-driven sponsorship exposure system or program, which detects and/or identifies 230 assets, or brands, and exposure types. BVS then receives, calculates, or generates 240 viewership numbers, that in several embodiments are segmented or broken down by demographics, media platforms or devices; the viewership numbers may include but are not limited to the number of viewers of a media item, media asset, the duration of views of media items and/or assets, viewer profiles and/or demographic data.

BVS then determines whether the asset(s) are recognizable, clear and/or visible 250 including by measuring or calculating factors such as occlusion, blurriness, clarity, and contrast of one or more assets in the images/frames/video and/or the media item itself. Other calculations may include brand visibility duration in the video or segments of video, brand screen share in the video or segment frame, and the number and types of views present during the type of asset exposure. The AI-driven sponsorship exposure system may also generate 260 additional metrics that may include the screenshare, prominence and/or position of an asset in the media item. For example, a logo or asset size may determine the effectiveness of the exposure.

BVS may then use, generate, and/or use generated 270 auction equivalent prices based on the valuation settings along with engagement-based valuation to calculate 280 the value of the video/frame(s)/media item/or asset value that is posted or published. These calculations and metrics produced may incorporate or input values from an auction price database, valuation methodology or cost per metric formula (E.g., CPE, CPM, CPV), or other custom values to calculate 280 the value of the video post for each present brand. In several embodiments BVS extracts or applies user configuration settings of valuation methods 220 or other valuation settings that may have been automatically generated or pulled from other sources, and in various embodiments, along with the metrics generated by the AI-driven sponsorship exposure system and any other detected asset mentions, texts or links in the media item, including any engagement-based valuations, analytics auction equivalent prices based on one or more valuation method, and user configurations or methods, to calculate one or more of: the value of the post or published media item, brand, asset, and exposure type values in real-time, or the value of the video for each asset in the video.

In various embodiments, the video is segmented, and each segment is analyzed separately, or each segment is analyzed as its own frame, image or video. In preferred embodiments, the video post or publication and the assets shown are assessed based on their appearance and visibility in each segment. This allows comparisons to be made between different segments in terms of asset valuation, viewership numbers, types, and user devices. This allows BVS to determine how viewers are distributed and concentrated among the different segments. BVS may discount or increase the value of each segment based on these calculations.

In several embodiments, when the video is pulled or received 210, viewership retention graph(s) or data may be generated or received 215, which is then fed or provided to BVS alongside valuation settings of valuation methods 220 that are configured or set either by the user, or automatically generated. Using the viewership retention data, a valuation is undertaken, and a video post or publication value may be determined 225. This is then fed into BVS. In several embodiments, the value of a video for each asset or brand may be calculated 280 by video value for [brand]=video post value*video brand factor. The video brand factor may be calculated by video brand factor: screenshare*time on screen*quartiles factor. The value of an image/video for an asset in a video may be calculated by asset_value=post_value*asset_factor, where asset_factor=min (1.0, Σenclosure_asset_factor) where enclosure_asset_factor=enclosure_brand_factor_image/video*enclosure_asset_factor.

FIG. 3 presents one embodiment of a viewership retention graph 300 displaying live viewer numbers. The numbers of viewers are presented on the y-axis and the time is provided on the x-axis.

FIG. 4 presents one embodiment of the user interface 400 for calculating brand value based on viewer retention data throughout a video. This brand value calculation includes an audience retention graph 410 with time on its x-axis and number of viewers or size of audience on its y-axis. Below the x-axis, a visual table 420 listing each brand or asset that is visible or detected in the video is placed, with each row

430 representing a brand or asset. The detection of a brand throughout a video is indicated visually on the row which corresponds to the x-axis of the audience retention graph 410, an indication on a part of the horizontal row corresponds with a time on the x-axis of the audience retention graph 410. Each row may also include a real-time or live percentage counter or calculation 435 that provides information on the percentage of the video that includes each brand as well as the total period the asset is detected. In some embodiments, assets or brands are automatically added to the table as they are detected and/or identified.

FIG. 5 presents one embodiment of a user interface 500 to select a valuation method. In this user interface the user may select one of several selection options 510 including but not limited to cost per engagement ("CPE"), cost per impression ("CPM"), and cost per video views ("CPV") to value an asset or media item. Below the selection options 510 are the media platforms listed 520 with the chosen valuation method. The chosen valuation method for each media platform may default to one or more other metrics or valuation methods if the one selected is unavailable or unable to be utilized for a particular media platform or media item.

FIG. 6 presents one embodiment of a user interface 600 presenting a number of comparative graphs representing the average of each valuation method CPE, CPM and CPV each valuation method as on different media platforms.

FIG. 7 presents a graphical representation 700 of advertising rates over time for each elected media platform using a specific valuation method.

FIG. 8 presents a user interface for a strength meter 800. A brand visibility profile section 810 graphically displays the devices on which the brand has been viewed and/or meets a certain threshold of viewership to be categorized as visible. In this example, we see that the brand/asset has laptops and personal computers in green, representing that the brand has visibility in this media item with these types of user devices. The strength meter also includes a network device distribution graph 820 or measurements to inform users of how the views, impressions, or exposure is divided amongst different types of devices. Further, the strength meter 800 includes a resulting brand valuation 830 that incorporates the calculations of both the brand visibility profile as well as network device distribution, to display to users the different distributions per type of device.

The BVS strength meter, in various embodiments, estimates brand or asset visibility in each media item, based on 4 standard screen display sizes for each media item and asset, as how large or visible a brand logo or other asset is when viewed on a mobile device, laptop screen, tablet or external computer monitor display. Other screen sizes may be added or removed from these calculations. These calculations along with the distribution of viewers across media platforms and/or across devices are incorporated together to form an overall strength meter score or factor. Standard data may be used from media platforms instead of real-time figures to formulate these estimates.

FIG. 9 presents a user interface 900 for having valuation settings manually set by users. In this example, Barca TV has 'CPE' set as the overriding valuation method for videos. The user interface also allows the addition of other channels directly or through searches and/or other relevant information.

FIG. 10 presents a user interface 1000 where BVS predefines a set of parameters by media platform, and allows a user to adjust these figures manually. In this example, the default cost per engagement (CPE) is being shown for text, pictures, and videos.

FIG. 11 presents a user interface 1100 to display and compare real-time media advertising rates.

FIG. 12 presents an embodiment of a user interface 1200 displaying advertising rates visually by countries on a map.

FIG. 13 presents a user interface 1300 where a user has chosen manual real-time advertising rates and has applied them to the valuation methodologies for selected media platforms.

FIG. 14 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The components provided in the computer system 1 are those typically found in computer systems that may be suitable for use with embodiments of the present disclosure and are intended to represent a broad category of such computer components that are known in the art. Thus, the computer system 1 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network 60 via the network interface device 45 utilizing any one of several well-known transfer protocols (e.g., Hyper Text Transfer Protocol (HTTP)). While the machine-readable medium 50 is shown in an example embodiment to be a single medium, the term "computer-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the embodiments of the disclosure as described herein.

The computer program instructions may also be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 60 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depend on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

FIG. 15 shows an exemplary deep neural network.

Neural networks, also known as artificial neural networks (ANNs) or simulated neural networks (SNNs), are a subset of machine learning and are at the heart of deep learning algorithms. Their name and structure are inspired by the human brain, mimicking the way that biological neurons signal to one another. Artificial neural networks (ANNs) are composed of node layers, containing an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed along to the next layer of the network.

Neural networks rely on training data to learn and improve their accuracy over time. However, once these learning algorithms are fine-tuned for accuracy, they are powerful tools in computer science and artificial intelligence, allowing one to classify and cluster data at a high velocity. Tasks in speech recognition or image recognition can take minutes versus hours when compared to the manual identification by human experts. One of the most well-known neural networks is Google's search algorithm.

In some exemplary embodiments, one should view each individual node as its own linear regression model, composed of input data, weights, a bias (or threshold), and an output. Once an input layer is determined, weights are assigned. These weights help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming the input of the next node. This process of passing data from one layer to the next layer defines this neural network as a feedforward network. Larger weights signify that particular variables are of greater importance to the decision or outcome.

Most deep neural networks are feedforward, meaning they flow in one direction only, from input to output. However, one can also train a model through backpropagation; that is, move in the opposite direction from output to input. Backpropagation allows one to calculate and attribute the error associated with each neuron, allowing one to adjust and fit the parameters of the model(s) appropriately.

In machine learning, backpropagation is an algorithm for training feedforward neural networks. Generalizations of backpropagation exist for other artificial neural networks (ANNs), and for functions generally. These classes of algorithms are all referred to generically as "backpropagation". In fitting a neural network, backpropagation computes the gradient of the loss function with respect to the weights of the network for a single input-output example, and does so efficiently, unlike a naive direct computation of the gradient with respect to each weight individually. This efficiency makes it possible to use gradient methods for training multilayer networks, updating weights to minimize loss; gradient descent, or variants such as stochastic gradient descent, are commonly used. The backpropagation algorithm works by computing the gradient of the loss function with respect to each weight by the chain rule, computing the gradient one layer at a time, iterating backward from the last layer to avoid redundant calculations of intermediate terms in the chain rule; this is an example of dynamic programming. The term backpropagation strictly refers only to the algorithm for computing the gradient, not how the gradient is used; however, the term is often used loosely to refer to the entire learning algorithm, including how the gradient is used, such as by stochastic gradient descent. Backpropagation generalizes the gradient computation in the delta rule, which is the single-layer version of backpropagation, and is in turn generalized by automatic differentiation, where backpropagation is a special case of reverse accumulation (or "reverse mode").

With respect to FIG. 15, according to certain exemplary embodiments, the system produces an output, which in turn produces an outcome, which in turn produces an input. In some embodiments, the output may become the input.

In some embodiments, an expanded training set may be created. For example, the training set may include shared or posted media items, media types, where media type could be text, image, video, or content from an over-the-top ("OTT") media service; valuation methods; various brands, assets, scenes, media exposure types, variations in visual appearance, occlusion, blurriness, contrast, size, appearance duration, and other data items, including those discussed herein.

In various exemplary embodiments, the neural network may receive input such as a correct indication for the particular data item. A set of known and/or unknown data items may be fed into the neural network. Should something such as a significant increase in false positives take place, these false positives may be minimized by such techniques as performing an iterative training algorithm, in which the system is retrained with an updated training set containing the false positives.

Additionally, according to some exemplary embodiments, an error rate for the one or more data items may be determined until the error rate stops converging or cannot converge.

Various exemplary embodiments include a valuation system to measure sponsorship exposure in social media, including the ability to use multiple valuation methods, such as CPV, CPM, and CPE, integrated into the valuation system, in a real-time manner, while aggregating the most up-to-date data. It may categorize the social media by media type, image, video or text, and may run different valuation strategies based on the media type. It may adapt a valuation strategy based on the source platform of the publication, and detect the sponsorship exposures and inputs into the valuation method, as one or more factors to the valuation system, in the real-time manner. Additionally, granular valuation may be supported, given the output from the AI-driven system, on brand, asset, scene, and media exposure types. It also supports valuation on a real-time ad rate, a device factor, customization based on user configurations, e.g., a discounted factor, and/or supports live stream.

Advantageously, the real-time valuation system focuses on aspects including the AI-driven sponsorship exposure measurement system running in a real-time manner and feeding the results to the valuation system to generate the results. The moment the posts are published and polled into the Blinkfire system, the sponsorship exposure system is generating the brand, asset, scene, and media exposure type (active or passive) to the valuation system. In the image case, it is less than a second to get the sponsorship information listed above. The valuation system is running in real-time and aggregates the most up-to-date information. The aggregated data is dynamic in the backend, as new posts come into the valuation system. This is essentially different from a stalled report, with fixed figures. The input factors to the valuation system are real-time, which includes the viewership information is real-time polled and always reflecting the most up-to-date information. The ad rate (auction rate) is dynamic and consistent with the platform ad rates. Those inputs are plugged into the valuation system to ensure the authentic data is used, in a real-time manner, to use in the valuation calculation.

The AI-driven sponsorship exposure measurement system is preferred for the following reasons: BVS is more than brand detection; the AI-driven sponsorship exposure measurement system covers the input to BVS, including, brand, asset, scene, active passive media exposure, and more. BVS provides full support to the valuation system in customization, and flexibility in valuation configuration including: configuration by media type; configuration by social platform; and configuration by device factor, ad rate etc.

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the invention in the form disclosed. Many modifications and variations will be apparent to those of ordinary skill in the art without departing from the scope and spirit of the invention. Exemplary embodiments were chosen and described to best explain the principles of the present technology and its practical application, and to enable others of ordinary skill in the art to understand the invention for various embodiments with various modifications as are suited to the particular use contemplated.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The various embodiments described above, are presented as examples only, and not as a limitation. The descriptions are not intended to limit the scope of the present technology to the forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed are:

1. A method for valuing media content exposure, the method comprising:
   detecting a media item on a media platform;
   categorizing the media item into a media type;
   selecting at least one valuation method from one or more recognized valuation methods;
   sending the media item to an AI-driven brand-spotter system, the brand-spotter system configured to:
      detect brands, assets, scenes, and active versus passive exposure types in the media item using computer vision coupled with machine learning; and
      generate metrics of the detected brands, assets, scenes, and the active versus passive exposure types; and
   valuing one or more of the media items, the detected brands, assets, and scenes, and the active versus passive exposure types present via one or more of customizable or preset cost per metric formulas, custom or preset valuations, and in relation to auction prices for advertising rates auction prices;
   wherein the valuing the one or more of the media items, the detected brands, assets, and scenes, and the active versus passive exposure types present via the one or more of customizable or preset cost per metric formulas, custom or preset valuations, and in relation to the auction prices for the advertising rates auction prices is a granular valuation, the granular valuation including adapting to changes in performance signals and including a strength meter, the strength meter being an indicator of strength of the detected brands based on a visual appearance of the media item and visibility of the detected brands on different types of devices.

2. The method of claim 1, further comprising detecting a posted media item on an application.

3. The method of claim 1, the metrics including a visual appearance.

4. The method of claim 1, the metrics including occlusion.

5. The method of claim 1, the metrics including blurriness.

6. The method of claim 1, the metrics including contrast.

7. The method of claim 1, the metrics including size.

8. The method of claim 1, the metrics including appearance duration.

9. The method of claim 1, the metrics including viewers present at time of exposure.

10. The method of claim 1, the metrics including screen share of the brands.

11. The method of claim 1, the media type including text.

12. The method of claim 1, the media type including an image.

13. The method of claim 1, the media type including a video.

14. The method of claim 1, the media type including a three-dimensional media item.

15. The method of claim 1, the media type including an asset.

16. The method of claim 1, the media type including an asset set in augmented reality or in virtual reality.

17. The method of claim 1, wherein categorizing the media item into the media type further comprises identifying whether the media item is a text post, image post, video post, or a carousel post containing multiple media types.

18. The method of claim 1, wherein the AI-driven brand-spotter system further generates device visibility profiles for each detected brand, asset, or scene in the media item.

19. The method of claim 1, wherein the granular valuation includes determining a brand value in a video post by multiplying a video post value by a video brand factor, the video brand factor comprising a screenshare factor, a time on screen factor, and a quartiles factor.

20. A non-transitory computer readable medium having instructions thereon for execution by a processor, the instructions comprising a method for generating a monetary valuation of sponsorship exposure in a media item, the method comprising:

detecting a media item on a media platform;

categorizing the media item into a media type;

selecting at least one valuation method from one or more recognized valuation methods;

sending the media item to an AI-driven brand-spotter system, the brand-spotter system configured to:

detect brands, assets, scenes, and active versus passive exposure types in the media item using computer vision coupled with machine learning; and generate metrics of the detected brands, assets, scenes, and the active versus passive exposure types; and valuing one or more of the media items, the detected brands, assets, and scenes, and the active versus passive exposure types present via one or more of customizable or preset cost per metric formulas, custom or preset valuations, and in relation to auction prices for advertising rates auction prices;

wherein the valuing the one or more of the media items, the detected brands, assets, and scenes, and the active versus passive exposure types present via the one or more of customizable or preset cost per metric formulas, custom or preset valuations, and in relation to the auction prices for the advertising rates auction prices is a granular valuation, the granular valuation including adapting to changes in performance signals and including a strength meter, the strength meter being an indicator of strength of the detected brands based on a visual appearance of the media item and visibility of the detected brands on different types of devices.

\* \* \* \* \*